March 18, 1958 S. POLIS ET AL 2,827,538

ELECTRICALLY HEATED EYEPIECE AND PROCESS OF MANUFACTURE

Filed Oct. 11, 1954

INVENTORS.
SAMUEL POLIS
DOMENICK NICOLETTI
BY [signature]
A H [signature]
ATTORNEY'S United States Patent Office 2,827,538
Patented Mar. 18, 1958

2,827,538

ELECTRICALLY HEATED EYEPIECE AND PROCESS OF MANUFACTURE

Samuel Polis, Springfield, and Domenick Nicoletti, Philadelphia, Pa., assignors to the United States of America as represented by the Secretary of the Navy Application October 11, 1954, Serial No. 461,697

12 Claims. (Cl. 219—19)

(Granted under Title 35, U. S. Code (1952), sec. 266)

The invention described herein may be manufactured and used by or for the Government of the United States of America for governmental purposes without the payment of any royalties thereon or therefor.

The present invention relates to improvements in heated transparent eyepieces.

An object of this invention is to provide an electrically heated eyepiece or visor wherein the conductors forming the heating circuits are mounted so that their possibilities of displacement or contact with disturbing influences are prevented.

Another object of this invention is to provide an electrically heated eyepiece or visor wherein the conductors forming the heating circuit are completely embedded in an element of the eyepiece so that a more compact structure having no insulation problems is formed.

Still another object of this invention is to provide a novel eyepiece construction of sturdy construction and capable of a wide range of applications.

A further object of this invention is the provision of a novel method of constructing electrically heated transparent structures.

A still further object of this invention is the provision of novel methods of forming laminated electrically heated eyepieces or visors.

Other objects and many of the attendant advantages of this invention will be readily appreciated as the same becomes better understood by reference to the following detailed description when considered in connection with the accompanying drawings wherein.

Figures 1, 2, 3:
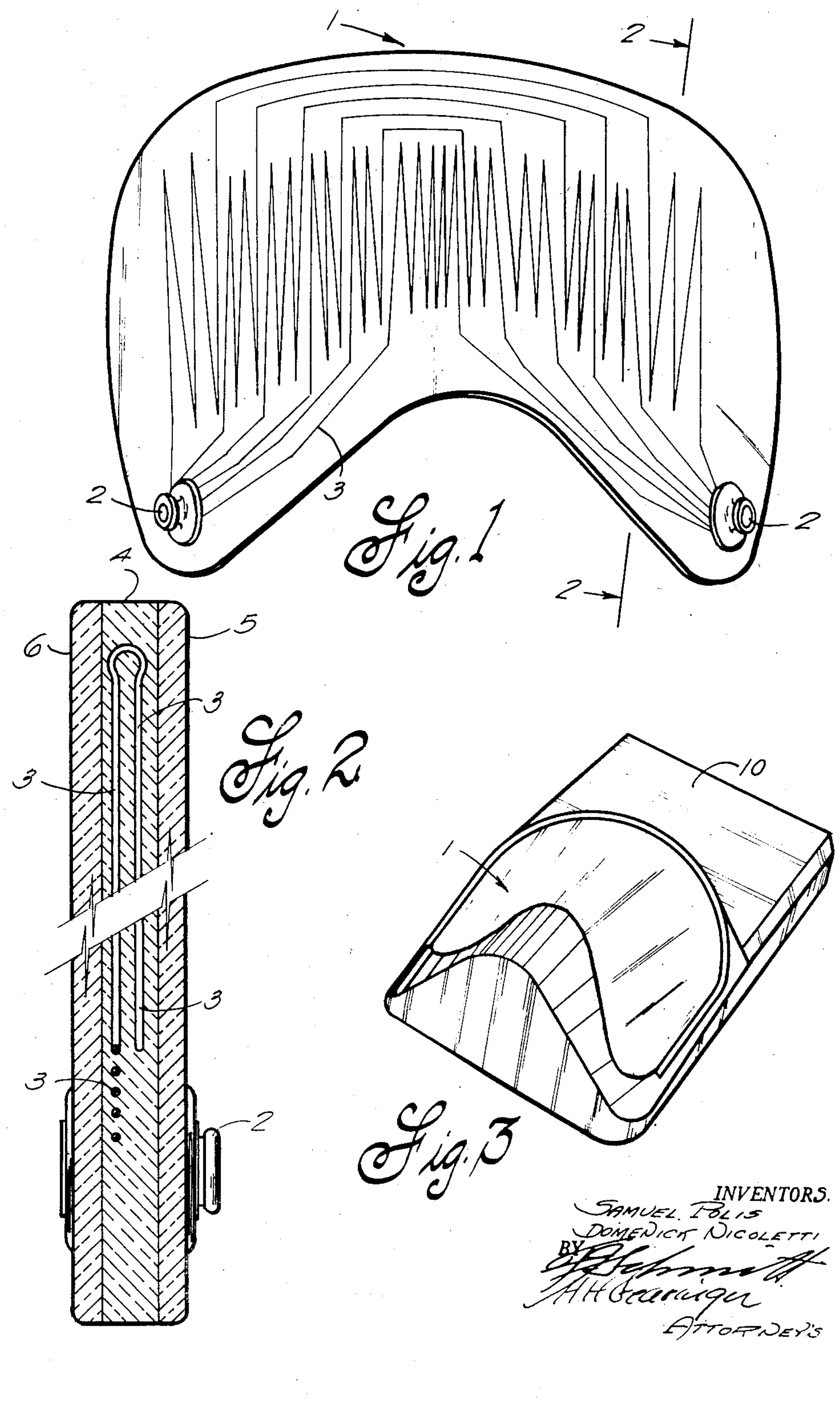
Figure 1 is the front view of a novel eyepiece formed according to the method.
Figure 2 is a section along the line 2—2 of Figure 1.
Figure 3 is an isometric of an eyepiece being formed on a mold.

Figure 1 shows a novel eyepiece formed according to the method described in detail below. The eyepiece 1 may have the configuration as shown in this figure or may have any shape found convenient and desirable. The shape shown in the figure is intended by way of illustration only and not as a limitation as it forms no part of the invention.

Mounted at each end of the eyepiece 1 are terminal buttons 2 which are adapted to receive the means coupling the heating circuit to a source of electrical energy. Connected between the two terminal buttons are six parallel electrical circuits formed by conductors made of any suitable material such as No. 40 Chromel wire, this particular type of wire having sufficient resistance to yield the desired heating effect when connected to a source of potential and, more important, being relatively small in diameter or cross-section to thereby permit substantially unobstructed vision through the eyepiece 1. While No. 40 Chromel wire has been found to be a very suitable conductor, it will be obvious to these skilled in the art that any other type of conductor may be utilized which will yield the desired heating effect and at the same time have little or no effect on the visibility through the eyepiece. The parallel circuits are disposed over the eyepiece in order to provide effective heating means where needed. The number and type of circuits and their disposition is not to be considered a limitation as this too may be varied to meet individual needs.

The circuits are formed by the wires 3 embedded in a transparent inner sheet 4 formed of a flexible plastic material such as vinyl. Bonded to each face of the inner sheet or member 4 are outer sheets or members 5 and 6.

It can be seen that this construction yields an electrically heated eyepiece wherein the conductors are completely surrounded by the material of the sheet which carries them and are therefore incapable of displacement or being subject to contacts with corrosive or other disturbing influences.

METHOD OF FORMING THE EYEPIECE

A master circuit diagram is prepared and placed over a clear transparent sheet of polished vinyl plastic 0.015" thick. Wherever the direction of a wire is altered, holes are punched in the sheet of plastic. Placing the sheet in a frame or any suitable support, wire is sewn on the sheet so that the circuit of the master circuit diagram is duplicated on the sheet. In the sewing process, the conductor is passed through the first hole, over the first face, through the second hole, over the opposite face, through a third hole adjacent the first hole, over the first face, through a fourth hole adjacent the second hole, etc. Thus, prior to the heat and pressure treatment, the conductors lie upon the opposite faces of the sheet 4.

The sheet is then placed between chrome plated steel plates and put in between the platens of a hydraulic press, which platens have been preheated to 300° F.±10°. Evening up the plates may be necessary and any suitable shim material may be used. After five minutes at contact, the pressure is increased to 250 p. s. i.±10 p. s. i. for fifteen minutes. Holding the pressure constant, the temperature is then lowered to something less than 150° F. The pressure is then released and the vinyl sheet removed from the press. The heating wires 3 previously exposed alternately on both sides of the sheet are now completely embedded by the process into the sheet 4. Due to the fluid nature of the plastic when subjected to heat and pressure, the plastic flows completely around the conductor and completely embeds it.

It may be found that variations of the heat, pressure and time are necessary depending on the materials to be used. The specific example noted above was determined by the vinyl material, its dimensions and the dimensions of the wire. Other combinations of these conditions will be called for in other situations.

The laminated structure shown in cross section in Figure 2 may be built by any one of several methods.

*Method I*

Sheets of plastic such as methyl methacrylate type are cut to the desired shape and in one instance their faces were 0.060" thick. The sheets are heated to 240° F.±5°. One sheet is then formed on a mold 10 using any suitable means such as a cold-water-insoluble flexible polyvinyl film drawn over the sheet to hold it in position until this first sheet is cool enough to retain its shape. The second sheet of acrylic plastic is molded while hot over the first sheet and held in position until cool.

The sheets may then be taken from the mold and the holes for the terminal buttons 2 formed therein. After placing one face piece on the mold, its exposed surface is coated with a vinyl-acrylic adhesive such as Acryloid A-10 manufactured by the Rohm & Haas Company, Philadelphia, Pa. The inner member 4 of vinyl plastic formed in accordance with the step described above is placed over this first face piece and the exposed surface of the inner member is likewise coated with the adhesive. The second face piece is placed on top of the adhesive coated inner member and all three pieces are held in position on the mold for a suitable period of time. Using the sheets of the dimensions set out above, this period was twenty-four hours. After the removal of the assembly from the mold the terminal buttons are inserted and the heated eyepiece or visor shown in Figure 1 is the result. This method may be described as a low pressure-adhesive method of forming the laminated structure.

*Method II*

A high pressure-heat method of forming the laminate is as follows:

The acrylic face pieces are cut to shape and the holes for the terminal button 2 are formed therein. The vinyl inner member formed according to the first part of the entire method is placed between the two faces and the entire assembly placed between two cold chrome-plated steel plates. This assembly is then placed between two thicker chrome-plated steel plates which have been preheated to 250° F.±5° and then placed in the hydraulic press, the platens of which are also at 250° F.±5°. The pressure is immediately raised to 1300 p. s. i.±100 p. s. i. In the next fifteen seconds the pressure is raised gradually to 4350 p. s. i.±150 p. s. i. The temperature is held at 250° F. for one minute and then cooled 150° F. prior to releasing the pressure.

The laminated structure then formed is removed and heated in an oven to 250° F.±5°. Taken from the oven, the hot laminate is formed on the mold and held in position on the mold until it is cool enough to retain its shape. The terminal buttons are then inserted and the laminated heated eyepiece of Figure 1 is the result.

It is to be understood that the temperatures and pressures used in the fabrication of the laminates were determined by the dimensions and materials used. Other dimensions and material would require different temperatures and pressures and these are set out by way of illustration only.

Thus, there has been described at least two methods of forming a laminated electrically heated eyepiece.

Obviously many modifications and variations of the present invention are possible in the light of the above teachings. It is therefore to be understood that within the scope of the appended claims the invention may be practiced otherwise than as specifically described.

What is claimed is:

1. The method of forming a laminated electrically heated visor comprising the steps of; embedding a plurality of electrical conductors in a first sheet of transparent plastic by forming a plurality of holes in said first sheet, passing the conductors through said holes and subjecting the resultant structure to heat and pressure to embed the conductors in the sheet, molding a second sheet of transparent plastic to a desired shape, molding a third sheet of transparent plastic over said second sheet to the same desired shape, separating the second and third sheets of plastic and coating one face of said second sheet with an adhesive while it is held in a mold, placing said first sheet on the adhesive coated face of said second sheet, coating the uncovered face of said first sheet with an adhesive, placing said third sheet on the adhesive coated face of said first sheet to form a sandwich, retaining said sandwich on the mold for a period of time.

2. An electrically heated eyepiece or the like comprising a transparent plastic inner member, electrical conductors imbedded in said inner member and forming a plurality of parallel circuits disposed over said eyepiece, said conductors having a relatively small cross-section to thereby permit substantially unobstructed vision through said eyepiece, outer transparent plastic members substantially identical in size and shape to said inner transparent member bonded on opposite faces of said inner transparent member, and a pair of terminal buttons extending through said inner and outer members for connecting said conductors with a source of potential.

3. A laminated electrically heated visor comprising a curved inner transparent member, a pair of curved outer transparent members bonded to opposite faces of said inner member, said outer transparent members being substantially identical in size and shape to said inner transparent member, a plurality of small diameter conductors imbedded in said inner member defining a plurality of parallel heating circuits, said conductors permitting substantially unobstructed vision through said eyepiece and being arranged therein to provide a predetermined heat distribution, a terminal button extending through said inner and outer members and connected to said conductors at one end thereof, and a second terminal button extending through said inner and outer members and connected to said conductors at the opposite end thereof.

4. A laminated electrically heated visor as claimed in claim 3 wherein said conductors are made of No. 40 Chromel wire.

5. A laminated electrically heated visor as claimed in claim 3 wherein said inner member is made of vinyl.

6. A laminated electrically heated visor as claimed in claim 3 wherein said outer members are made of a methyl methacrylate type plastic.

7. A method of making a laminated electrically heated visor comprising the steps of placing a circuit diagram over a sheet of transparent plastic, forming a plurality of holes in said sheet of plastic in a predetermined pattern determined by said circuit diagram, sewing conductors to said sheet of plastic by passing the conductors through said holes and over opposite faces of said sheet of plastic, subjecting the sheet of plastic for a predetermined time to a predetermined temperature and pressure to imbed said conductors in said sheet, placing said sheet with said conductors imbedded therein between second and third sheets of transparent plastic, subjecting the three sheets of plastic for a predetermined time to a predetermined temperature and pressure to produce a laminated assembly, heating the laminated assembly in an oven at a predetermined temperature for a predetermined time, and forming the heated laminated assembly on a mold to the desired curvature.

8. A method of making a laminated electrically heated visor comprising the steps of placing a circuit diagram over a sheet of transparent plastic, forming a plurality of holes in said plastic sheet in a selected pattern determined by said circuit diagram, sewing conductors to said sheet to duplicate said circuit diagram by passing conductors through said holes and over opposite faces of said sheet, placing the sewed sheet between the preheated platens of a pressure means, subjecting the sewed sheet for predetermined times to predetermined temperatures and pressures to completely imbed said conductors in said sheet, placing said imbedded sheet between second and third transparent plastic sheets having a size and configuration substantially identical to said imbedded sheet, placing the three sheets between the preheated platens of a pressure means, subjecting the three sheets for predetermined times to predetermined temperatures and pressures to form a bonded and laminated assembly, heating the laminated assembly in an oven at a predetermined temperature for a predetermined length of time, placing the laminated assembly on a mold, and forming the laminated assembly on the mold to yield a visor of the desired contour.

9. A method of making a laminated electrically heated transparent visor comprising the steps of forming a pair of apertures in a sheet of transparent plastic, placing a circuit diagram over said plastic sheet, forming a plurality of holes in said plastic sheet in a selected pattern determined by said circuit diagram, passing conductors through said holes and over opposite faces of said sheet to duplicate said circuit diagram on said sheet, placing the sheet with the conductors thereon between the platens of a press heated to a predetermined temperature, subjecting the sheet to a predetermined pressure for a predetermined length of time to completely embed said conductors in said sheet, reducing the temperature of said sheet below a predetermined temperature, removing the embedded sheet from said press, forming a pair of apertures in second and third sheets of transparent plastic having a size and configuration substantially identical to said embedded sheet, placing the embedded sheet between said second and third sheets, placing the assembly of the three sheets between opposed plates, placing the opposed plates holding the assembled sheets between second opposed plates heated to a predetermined temperature, placing the second opposed plates between the platens of a press having a predetermined temperature, raising the pressure on said platens and said sheets assembled therebetween to a predetermined value, holding said predetermined temperature and said second predetermined pressure constant for a predetermined time to form a bonded and laminated assembly of said three sheets, reducing the predetermined temperature of said laminated assembly, releasing the pressure on said laminated assembly, removing said laminated assembly from said press, heating said laminated assembly in an oven to a predetermined degree, placing the heated laminated assembly on a mold having a predetermined configuration, bending the heated laminated assembly to the configuration of the mold, and holding the laminated assembly in its bent position on the mold until it is sufficiently cooled to retain the shape of the mold.

10. A method of making a laminated electrically heated visor as claimed in claim 9 including the additional step of removing the laminated assembly from the mold after it is sufficiently cooled, and inserting terminal buttons in the pairs of apertures formed in the three sheets of the assembly.

11. A method of making a laminated electrically heated transparent visor as claimed in claim 9 wherein said transparent sheet having said conductors imbedded therein is comprised of a vinyl plastic, wherein the press platens between which the vinyl sheet with the conductors thereon are preheated to a predetermined temperature of 300° F.±10°, wherein the vinyl sheet with the conductors thereon is subjected to a predetermined pressure 250±10 p. s. i. for a period of fifteen minutes, and wherein the imbedded vinyl sheet is reduced in temperature below 150° F. before being removed from said press.

12. A method of making a laminated electrically heated visor as claimed in claim 9 wherein said second and third sheets of said laminated assembly are comprised of a methyl methacrylate type of plastic, wherein said second opposed plates are heated to a predetermined temperature of 250° F.±10°, wherein said pressure on said three assembled sheets is raised to 1300 p. s. i.±100 p. s. i., wherein said pressure on said assembled sheets is gradually increased to 4350 p. s. i.± 150 p. s. i. over a predetermined time of fifteen seconds, wherein said constant predetermined temperature of said pressurized assembly is held at 250° F. for a predetermined time of one minute, wherein the predetermined temperature of said pressurized and laminated assembly is reduced 150° F. before releasing the pressure thereon, and wherein the predetermined oven temperature is 250° F.±5°.

References Cited in the file of this patent

UNITED STATES PATENTS

| | | |
|---|---|---|
| 761,204 | Carpenter | May 31, 1904 |
| 2,149,507 | Camfield | Mar. 7, 1939 |
| 2,222,742 | Cucret et al. | Nov. 26, 1940 |
| 2,275,228 | Mitchell | Mar. 3, 1942 |
| 2,427,557 | Gregorius | Sept. 16, 1947 |
| 2,439,892 | Huck | Apr. 20, 1948 |
| 2,470,509 | Marini | May 17, 1949 |
| 2,473,183 | Watson | June 14, 1949 |
| 2,623,150 | Boecher et al. | Dec. 23, 1952 |
| 2,631,219 | Suchy | Mar. 10, 1953 |

FOREIGN PATENTS

| | | |
|---|---|---|
| 537,688 | Great Britain | July 2, 1941 |
| 599,617 | Great Britain | Mar. 17, 1948 |
| 1,027,350 | France | Feb. 11, 1953 |